United States Patent Office 3,211,502
Patented Oct. 12, 1965

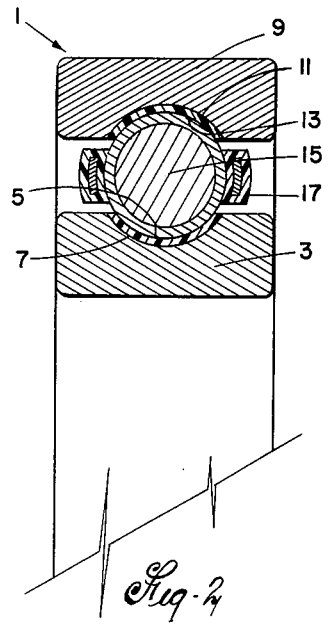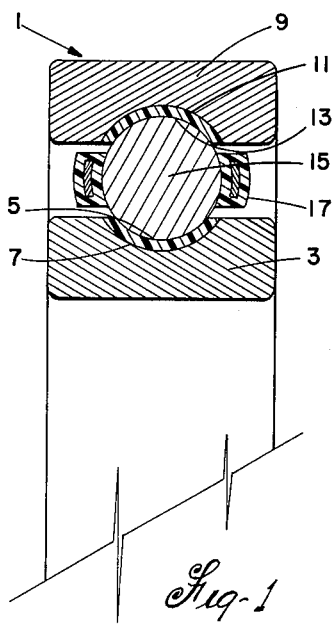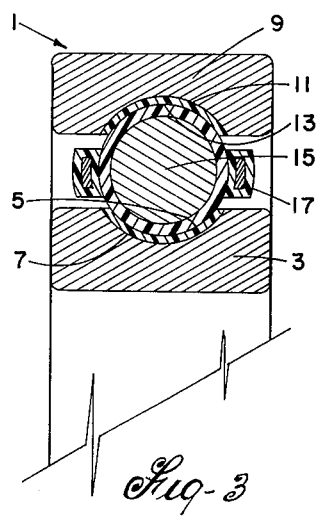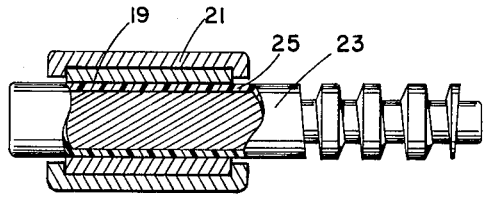

3,211,502
LUBRICATED BEARING ASSEMBLY
Edward R. Lamson, Greentree Road, Sewell, N.J., and
Martin J. Devine, 2560 Prescott Road, Havertown, Pa.
Filed Aug. 29, 1963, Ser. No. 305,565
7 Claims. (Cl. 308—121)
(Granted under Title 35, U.S. Code (1952), sec. 266)

This is a continuation-in-part of patent application, Serial No. 155,872 filed Nov. 29, 1961, now abandoned in favor of the present application.

The invention described herein may be manufactured and used by or for the Government of the United States of America for governmental purposes without the payment of any royalties thereon or therefor.

This invention relates to an improved lubricated bearing structure including the elements of both plain and antifriction bearings and more particularly is directed to a bearing structure having a dry film lubricant, capable of being regenerated, bonded between the working surfaces thereof.

This invention is directed toward providing an improvement upon the lubricating effects of the dry films bonded to bearing structures described in our Patent No. 3,079,204 and also upon the lubricating effects of the dry films bonded to bearing structures described in a copending application entitled Solid Lubricant Composition and Method for Lubricating Bearing Structure, Serial No. 146,664.

Both in the patent and in the application, we teach bonding a dry film lubricant to the component parts of an antifriction bearing. The solid lubricant, molybdenum disulfide, is incorporated into a film, comprising the disulfide and one from the group consisting of a metallic silicate, phosphate or borate. This film, when bonded to the surfaces of the component parts of an antifriction bearing possesses the property of providing a low coefficient of friction between the working surfaces whereby a minimum of surface damage results even at high temperatures.

Alfred DiSapio, research technologist of Alpha Molykote Corporation, published an article entitled "Bonded Coatings Lubricate Metal Parts," Product Engineering, Sept. 5, 1960, pages 48–53, wherein he discusses the effects of the bonded solid-film lubricants disclosed in our above specified patent and application. He was favorably impressed with the overall evaluation of these solid-film lubricants; however, he does mention one serious limitation in regard to these bonded solid-film lubricants. The lubrication is nonrenewable except by completely disassembling the mechanism and reworking the part. Although these bearings operated for considerable periods of time at ambient temperatures as high as 850° F., the film of molybdenum disulfide would eventually be worn away thereby exposing the bare metal resulting in a failure of the bearing.

Heretofore, there have been attempts to regenerate molybdenum disulfide at the surface of a lubricated bearing. These attempts have confined themselves to manufacturing the working surfaces of a bearing out of molybdenum metal, and then introducing hydrogen sulfide gas into the bearing housing so that it passes over the bearing surfaces. The sulphiding gas will react with the molybdenum disulfide at the surfaces of the bearing. This method of furnishing a continuous stream of molybdenum disulfide to the working surfaces of bearing components suffers from some inherent disadvantages, such as:

(1) The need of an elaborate system for storing and supplying the gas to the structure being lubricated thereby increasing the initial weight and cost of the bearing.

(2) A critical temperature must be maintained since under a temperature of 550° C. there would be no reaction and above 600° C. the sulfiding action would be so rapid that there would be danger of excessive wear by continuous formation and rubbing off of molybdenum disulfide.

(3) There must be a continuous supply of gas because once the gaseous input is discontinued the molybdenum disulfide layer will quickly wear off and the system would cease to function resulting in galling and seizing of the bearing thereby causing an almost immediate failure.

Accordingly, an object of this invention is to provide an improved bearing assembly having a dry-film lubricant bonded thereto, which is not restricted to molybdenum disulfide as a main constituent in order to obtain satisfactory lubrication, which can operate at temperatures of 850° F. or higher without failure, which operates as a self-contained structure for regenerating the dry-film lubricant in a simple and inexpensive manner upon its being worn away under extreme pressure and temperatures.

Another object of this invention is to provide a bearing structure having a dry-film lubricant wherein the principal constituent in the film is a sulfur-containing compound heretofore not considered to be useful as a lubricant.

In brief, our invention contemplates making at least one of the component parts of a bearing structure out of molybdenum and bonding a solid film lubricant containing a sulfide to a second component part of the bearing which is in frictional contact with the molybdenum. Accordingly, we provide bearing assemblies characterized by each assembly having its own self-contained lubricating means, the combination of molybdenum and a coating of a metallic sulfide for the bearing surfaces bonded thereto by a bonding agent producing unexpected long bearing life over a wide temperature range.

The invention is hereinafter described, by way of example, with reference to the accompanying diagrammatic drawing, in which:

FIG. 1 is an enlarged segment in cross-section of a bearing illustrating one embodiment of the invention in its application to antifriction bearings;

FIG. 2 is a view similar to FIG. 1 illustrating a second embodiment of the invention in its application of antifriction bearings;

FIG. 3 is a view similar to FIG. 1 illustrating a third embodiment of the invention in its application to antifriction bearings; and FIG. 4 is a sectional elevation illustrating a construction of plain bearing assembly according to the invention.

In FIGS. 1–3, like structural details and components are designated by like reference numerals.

Referring more particularly to FIG. 1, an antifriction bearing 1 of the ball-type having components including an inner ring or race means 3 provided with a circumferentially extending groove or raceway 5 in the outer periphery 7 thereof and an outer ring or race means 9 provided with a circumferentially extending groove or raceway 11 in the inner periphery 13 thereof. A plurality of substantially spherical rolling elements or balls 15 are carried in the raceways 5 and 11; and, because of a predetermined curvature in the raceways, are confined therein for rotary movement in a substantially circular orbit between the inner and outer race means 3 and 9. A predetermined clearance or tolerance (not shown in the drawings) between the balls 15 and the raceways 5 and 11 permits the balls to roll freely over the surfaces of the raceways.

A retainer 17 is carried by the balls 15 in order to space them a uniform distance apart thereby equalizing any load that may be applied to the balls through the races 3 and 9. The retainer 17 is provided with a plurality of pockets (not shown) each of which is adapted to receive a ball. The inner periphery of each pocket is provided with a predetermined curvature and is adapted to be carried on the peripheral surface of its received ball so as to be in frictional contact therewith.

EXAMPLE I

The steel retainer 17 of a 204 size ball bearing 1 (FIG. 1 was coated from molybdenum. This part need not be fabricated of solid molybdenum, but must comprise at least a surface layer of molybdenum. A wide temperature range solid film lubricant comprising a dry weight basis 71% $MoS_2$, 7% graphite and 22% sodium silicate was applied to the races 5 and 11 and retainers 17 in accordance with the method described in our issued Patent No. 3,079,204. After the bonded film was applied to the component parts, the bearing was assembled. The bearing was subjected to high speed rotation of 10,000 r.p.m. at a temperature of 350° F. The test load was 5 lbs. thrust and 3 lbs. radial. A performance life of 10 hours was obtained.

EXAMPLE II

A second bearing structure (FIG. 2) was fabricated wherein a molybdenum coating was applied to the steel balls 15. The aforementioned solid film lubricant was bonded to the races and retainers. The test conditions were the same as described in Example I and a performance life of 11 hours was obtained.

EXAMPLE III

In this application, the retainers 17 were machined from molybdenum. The same solid film lubricating composition as in the above examples was utilized for the races and retainers and the steel balls 15. The test was conducted at 750° F., 10,000 r.p.m. The test load was 5 lbs. thrust and 3 lbs. radial. A performance life of 198 hours was obtained.

EXAMPLE IV

FIG. 4 illustrates the application of this invention to a plain bearing. The sleeve 19 is made of solid molybdenum or at least a coating of molybdenum. The sleeve is contained in a housing 21 comprising upper and lower parts which embrace the ends of the sleeve and extend close to the journal 23 with suitable clearance.

A bonded film lubricant 25 being one of the formulations listed below is placed on the journal.

The bonded film compositions are calculated on a dry weight basis.

| Sulfide | Percent Sulfide | Percent Graphite | Percent Sodium Silicate |
|---|---|---|---|
| $TiS_2$ | 71.5 | 6.87 | 21.6 |
| $Cr_2S_3$ | 45.4 | 13.10 | 41.4 |
| $MoS_2$ | 70.7 | 7.07 | 22.2 |
| $WS_2$ | 72.2 | 6.70 | 21.1 |
| $FeS_2$ | 78.0 | 5.30 | 16.6 |
| $Ag_2S$ | 68.0 | 7.70 | 24.2 |
| $ZnS$ | 55.7 | 10.67 | 33.5 |

These lubricant compounds were tested in a Falex lubricant tester according to the following procedure:

Test specimens consist of two V-blocks and a cylindrical pin. The pin was fabricated from pure molybdenum, M-10 tool steel, titanium alloy, nickel alloy and carbon steel (AISI-3135). The V-block material (AISI-1137 steel) was maintained as the solid film lubricated component. Prior to deposition of the solid film, a phosphating pretreatment was applied to the surfaces of the V-blocks. Wear tests were conducted at a gauge load of 1,000 lbs., and the results are recorded in the following tables:

| M-10 Tool Steel | Percent by Weight | Sulfide | Percent Sulfide | Percent Graphite | Percent Sodium Silicate | Wear Life at 1,000 lbs. (min.) |
|---|---|---|---|---|---|---|
| C | .83–.93 | | | | | |
| Mn | .10–.35 | $Ti_2S_3$ | 71.5 | 6.87 | 21.6 | 0 |
| P | .03 max. | $Cr_2S_3$ | 45.4 | 13.10 | 41.4 | 0 |
| S | .03 max. | $MoS_2$ | 70.7 | 7.07 | 22.2 | 73 |
| Si | .20–.40 | $WS_2$ | 72.2 | 6.70 | 21.1 | 2–0 |
| Cr | 3.75–4.50 | $FeS_2$ | 78.0 | 5.30 | 16.6 | 0 |
| Mo | 7.75–8.50 | $Ag_2S$ | 68.0 | 7.70 | 24.2 | 0 |
| W | 1.00–max. | $WS_2$ | 42.8 | 13.80 | 43.4 | 30–27 |
| V | 1.80–2.15 | $ZnS$ | 55.7 | 10.67 | 33.5 | 0–0 |

| Ti-Mn | Percent by Weight | Sulfide | Percent Sulfide | Percent Graphite | Percent Binder Solids | Wear Life at 1,000 lbs. (min.) |
|---|---|---|---|---|---|---|
| Mn | 7.9 | | | | | |
| Ti | 92.1 | $Ti_2S_3$ | 71.5 | 6.87 | 21.6 | 0 |
| | | $Cr_2S_3$ | 45.4 | 13.10 | 41.4 | 0 |
| | | $MoS_2$ | 70.7 | 7.07 | 22.2 | 0 |
| | | $WS_2$ | 72.2 | 6.70 | 21.1 | 1 |
| | | $FeS_2$ | 78.0 | 5.30 | 16.6 | 0 |
| | | $Ag_2S$ | 68.0 | 7.70 | 24.2 | 0 |
| | | $ZnS$ | 61.4 | 9.30 | 29.3 | 0 |

| Inconel X | Percent by Weight | Sulfide | Percent Sulfide | Percent Graphite | Percent Sodium Silicate | Wear Life at 1,000 lbs. (min.) |
|---|---|---|---|---|---|---|
| Ni | 73.0 | | | | | |
| Fe | 7.0 | Ti₂S₃ | 71.5 | 6.87 | 21.6 | 0 |
| Cr | 15.0 | Cr₂S₃ | 45.4 | 13.10 | 41.4 | 0 |
| CB (+TA) | .85 | MoS₂ | 70.7 | 7.07 | 22.2 | 18–10 |
| Al | .80 | WS₂ | 72.2 | 6.70 | 21.1 | 10–7 |
| Ti | 2.50 | FeS₂ | 78.0 | 5.30 | 16.6 | |
| C | .04 | Ag₂S | 68.0 | 7.70 | 24.2 | 0 |
| Mn | .70 | ZnS | 61.4 | 9.30 | 29.3 | 0 |
| Si | .30 | WS₂ | 42.8 | 13.80 | 43.4 | 1–1 |

| AISI-3135 St. | Percent by Weight | Sulfide | Percent Sulfide | Percent Graphite | Percent Binder Solids | Wear Life at 1,000 lbs. (min.) |
|---|---|---|---|---|---|---|
| C | .33–.38 | | | | | |
| Mn | .60–.80 | Ti₂S₃ | 71.5 | 6.87 | 21.6 | 0 |
| P (max.) | .040 | Cr₂S₃ | 45.4 | 13.10 | 41.4 | 0 |
| S (max.) | .040 | MoS₂ | 70.7 | 7.07 | 22.2 | 9–21–18 |
| Si | .20–.35 | WS₂ | 72.2 | 6.70 | 21.1 | 2–2 |
| Ni | 1.10–1.40 | FeS₂ | 78.0 | 5.30 | 16.6 | 0 |
| Cr | .55–.75 | Ag₂S | 68.0 | 7.70 | 24.2 | 0 |
| Fe | Bal. | ZnS | 61.4 | 9.30 | 29.3 | 0 |
| | | WS₂ | 42.8 | 13.80 | 43.4 | 1–1 |
| | | WS₂ | 68.4 | 7.60 | 23.9 | 0–0 |
| | | ZnS | 55.7 | 10.67 | 33.5 | 0–0 |

The comparative results when pure molybdenum is employed as the pin material are listed in the following table:

| Solid Molybdenum | Sulfide | Percent Sulfide | Percent Graphite | Percent Binder Solids | Wear Life at 1,000 lbs. (min.) |
|---|---|---|---|---|---|
| | Ti₂S₃ | 71.5 | 6.87 | 21.6 | 94 |
| | Cr₂S₃ | 45.4 | 13.10 | 41.4 | 51–42 |
| | MoS₂ | 70.7 | 7.07 | 22.2 | 160–123 |
| | WS₂ | 72.2 | 6.70 | 21.1 | 146 |
| | FeS₂ | 78.0 | 5.30 | 16.6 | 50 |
| | Ag₂S | 68.0 | 7.70 | 24.2 | 7–8 |
| | ZnS | 61.4 | 9.30 | 29.3 | 84–86 |
| | CdS | 60.3 | 9.50 | 30.1 | 6 |
| | Sb₂S₃ | 73.4 | 6.40 | 20.1 | 30 |
| | WS₂ | 42.8 | 13.80 | 43.4 | 215–200 |
| | ZnS | 55.7 | 10.67 | 33.5 | 141 |

In the following tables, we show the effects of solid-film lubricants, comprising a metallic sulfide and a binder material, upon the wear life of a molybdenum pin as compared with a steel pin. A wide variety of metallic sulfides have been selected for the purpose of demonstrating that all metal sulfides regardless of where the metal is classified in the periodic arrangement of the elements, show the ability to provide an unexpected lubricating effect when used in conjunction with molybdenum. As the results hereinbelow indicate some metallic sulfide bonded films resist wear better than some others; however, the important consideration is that they all show an improvement when compared with steel.

The results in Table I show the effects of an inorganic binder or bonding agent upon the wear-life capabilities of metallic sulfide bonded film lubricants. The results in Table II show the effects of an organic binder upon the wear life capabilities of metallic sulfide bonded film lubricants. Table III compares the effects of various binders upon the wear life of a molybdenum disulfide system.

TABLE I

| Metallic Sulfide | Binder | Wear Life (Minutes) | |
|---|---|---|---|
| | | Pin Material | |
| | | Mo | Steel |
| MoS₂ | Sodium Silicate | 120+ | 21 |
| WS₂ | do | 146 | 2 |
| Ti₂S₃ | do | 94 | 1 |
| Cr₂S₃ | do | 51 | 1 |
| HgS | do | 72 | 1 |
| ZnS | do | 84 | 1 |
| FeS₂ | do | 50 | 1 |
| CaS | do | 130 | 1 |
| FeS | do | 70 | 1 |
| CdS | do | 6 | 1 |
| TiS₂ | do | 135 | 1 |
| Ag₂S | do | 7 | 1 |
| Bi₂S₃ | do | 27 | 1 |
| Sb₂S₃ | do | 30 | 1 |
| SnS | do | 44 | 1 |

TABLE II

| Metallic Sulfide | Binder | Wear Life (Minutes) | |
|---|---|---|---|
| | | Pin Material | |
| | | Mo | Steel |
| Fe₂S₃ | Phenolic Resin | 240+ | 1 |
| CaS | do | 180+ | 4 |
| CuS | do | 100+ | 22 |
| CdS | do | 100+ | 30 |
| BaS | do | 100 | 10 |
| PbS | do | 40 | 9 |
| Cu₂S | do | 10 | 1 |

TABLE III

| Metallic Sulfide | Binder | Wear Life (Minutes) | |
|---|---|---|---|
| | | Pin Material | |
| | | Mo | Steel |
| MoS₂ | Sodium Metaborate | 300+ | 35 |
| MoS₂ | Sodium Silicate | 120+ | 20 |
| MoS₂ | Potassium Silicate | 120+ | 25 |
| MoS₂ | Sodium Hexameta Phosphate | 120+ | 38 |
| MoS₂ | Phenolic Resin | 100+ | 20 |
| MoS₂ | Epoxy Resin | 20 | 6 |
| MoS₂ | Silicone Resin | 80+ | 20 |

By observing and comparing the results in the above tables wherein the only differences in the test procedures were in the composition of the pin material, one can see that in all cases good results were obtained for the metallic sulfides in contact with pure molybdenum over other alloys. It is believed that for the first time types of chemical compounds are shown to be preferential as lubricating materials for a specific metal. In this case, a metallic sulfide is shown to be a good lubricant for a molybdenum surface. Thus, numerous metallic sulfiides, heretofore not considered or accepted as lubricants, can function as such providing the mating surface is molybdenum. Thus, the lubricant can be selected on the basis of operating requirements such as resistance to oxidation, superior thermal stability, and so forth.

It will be understood that various changes in the details, material and arrangements of parts which have been herein described and illustrated in order to explain the nature of the invention, may be made by those skilled in the art within the principle and scope of the invention as expressed in the appended claims.

What is claimed is:

1. A bearing assembly characterized by self-contained lubricating means comprising:
    (a) at least one bearing means coated with molybdenum; and
    (b) a second bearing means contiguous to the molybdenum coated bearing means and having a metallic sulfide bonded thereto by a bonding agent.

2. A bearing assembly according to claim 1, wherein at least one of the bearing means consists essentially of solid molybdenum.

3. A bearing assembly according to claim 1, wherein the metallic sulfide is molybdenum disulfide.

4. A self-contained lubricated antifriction bearing having component parts comprising in combination:
    (a) an inner race element having a raceway therein;
    (b) an outer race element having a raceway therein;
    (c) a plurality of rolling elements carried in said raceways and being movable relative thereto;
    (d) retainer means associated with said rolling elements to separate said rolling elements, the improvement therewith of having at least one of said elements coated with molybdenum and a metallic sulfide bonded by a bonding agent to at least one of the relatively movable component parts.

5. A self-contained lubricated antifriction bearing according to claim 4 wherein one of the elements consists essentially of solid molybdenum.

6. A bearing assembly having relative movable surfaces characterized by a self-contained lubricating means wherein:
    (a) at least one of the movable surfaces consists essentially of molybdenum;
    (b) a solid lubricant characterized by the presence therein of a metallic sulfide bonded to at least one of said relative movable surfaces by a bonding agent.

7. A bearing assembly characterized by self-contained lubricating means comprising:
    (a) at least one bearing means coated with molybdenum; and
    (b) a second bearing means contiguous to the molybdenum coated bearing means having a thin dry lubricating film bonded thereto by a bonding agent said film comprising on a dry weight basis of at least 40% of a metallic sulfide.

References Cited by the Examiner

UNITED STATES PATENTS 2,697,645   12/54   Mitchell _____ 308—188 X

OTHER REFERENCES

"Bonded Coatings Lubricate Metal Parts," Product Engineering, September 5, 1960, pps. 48–53 (p. 49 relied on).

DON A. WAITE, *Primary Examiner.*

ROBERT C. RIORDON, *Examiner.*